United States Patent
Amamori

(10) Patent No.: US 7,722,075 B2
(45) Date of Patent: May 25, 2010

(54) AIRBAG APPARATUS

(75) Inventor: Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/289,776

(22) Filed: Nov. 4, 2008

(65) Prior Publication Data
US 2009/0152841 A1    Jun. 18, 2009

(30) Foreign Application Priority Data
Dec. 13, 2007   (JP)   ............... 2007-321603

(51) Int. Cl.
*B60R 21/20*  (2006.01)
(52) U.S. Cl. ................. 280/728.2; 280/731
(58) Field of Classification Search ............. 280/731, 280/728.2; *B60R 21/20*
See application file for complete search history.

(56) References Cited

U.S. PATENT DOCUMENTS

| | | | |
|---|---|---|---|
| 4,278,638 A | 7/1981 | Nilsson et al. | |
| 4,902,036 A | 2/1990 | Zander et al. | |
| 5,131,677 A * | 7/1992 | Horiuchi et al. | ............. 280/731 |
| 5,697,639 A | 12/1997 | Vogel | |
| 5,860,672 A * | 1/1999 | Petersen | ............. 280/728.2 |
| 7,100,940 B2 * | 9/2006 | Kahler et al. | ............. 280/728.2 |
| 2005/0067818 A1 * | 3/2005 | Laue | ............. 280/731 |
| 2005/0104336 A1 * | 5/2005 | Schneider et al. | ............. 280/728.2 |

FOREIGN PATENT DOCUMENTS

| | | |
|---|---|---|
| DE | 42 17 956 A1 | 1/1993 |
| EP | 0 017 736 A | 10/1980 |
| JP | H02-262446 A | 10/1990 |
| JP | H03-76750 U | 7/1991 |
| JP | H07-291074 A | 11/1995 |

* cited by examiner

*Primary Examiner*—Ruth Ilan
(74) *Attorney, Agent, or Firm*—Manabu Kanesaka

(57) ABSTRACT

An airbag apparatus includes an airbag, a retainer, a bag ring to sandwich a periphery of an opening of the airbag between the retainer and the bag ring, and a gas-generating device inserted into the airbag for discharging a gas for development of the airbag. The bag ring includes an airbag-holding portion to sandwich the periphery of the base end portion of the airbag, an engaging portion provided at an end portion of the airbag-holding portion adjacent to the stitching portion and engaging the stitching portion when the base cloth panel is displaced from the bag ring, and a gas flow-regulating portion provided on an inner side of the airbag-holding portion. The flow-regulating portion has an inclined portion relative to a gas blowing direction for protecting the stitching portion from the gas ejecting from the gas-generating device.

3 Claims, 6 Drawing Sheets

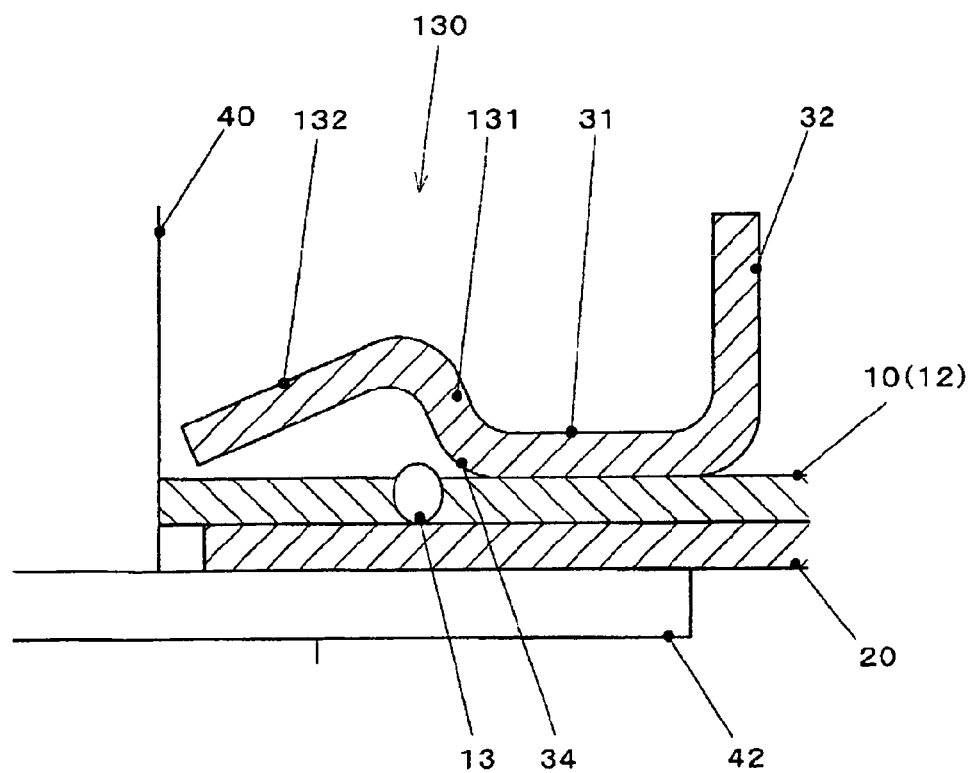

AIRBAG APPARATUS

BACKGROUND OF THE INVENTION AND RELATED ART STATEMENT

The present invention relates to an airbag apparatus mounted on a vehicle such as an automobile or the like, for restraining an occupant at a time of a collision, and more specifically, it relates to an airbag apparatus in which an airbag-fixing portion is protected from a high-temperature gas for developing the airbag (hereinafter the gas for developing the airbag is referred to as the gas for development) in the vicinity of the airbag-fixing portion on a vehicle body side, and in which a fixing strength for fixing the airbag is improved.

An airbag is provided with a blowing inlet through which a gas for development is blown into the airbag, and a peripheral edge portion of the blowing inlet is fixed to a member such as a retainer or the like provided on a vehicle body side.

Hitherto, in order to increase the fixing strength for fixing the airbag, it is well known that the airbag is sandwiched between a retainer where an inflator is inserted, and a pressing ring, and a chain-shaped seam is formed around a periphery of the blowing inlet, and the chain-shaped seam is engaged with a bore diameter surface of the retainer (for example, refer to Patent Document 1).

In the technology described in the Patent Document 1, an inner peripheral edge portion and an outer peripheral edge portion of a main part of the pressing ring having a flat plate shape, are risen in flange-shapes, respectively, so that a cross sectional surface shape thereof seen by cutting the pressing ring in a radial direction is formed to have an approximately C-shape.

Further, it is well known that a pressing member having a ring shape is formed with a spring steel so that the airbag is securely fixed with a simple structure, and the airbag is sandwiched between the pressing member and a base plate by utilizing the elasticity of the spring steel (for example, refer to Patent Document 2).

Furthermore, in the Patent Document 2, it is described that the gas for development, which is blown out from the inflator on an upper surface of a base plate portion, is introduced by means of bending an inner edge of the base plate portion of the pressing member downward, and the airbag is smoothly developed.

Patent Document 1: Japanese Unexamined Patent Application Publication No. 2-262446

Patent Document 2: Japanese Unexamined Patent Application Publication No. 7-291074

However, in the technology described in the aforementioned Patent Document 1, since a part of the gas for development, which is blown out from the inflator sometimes, flows into a space between the pressing ring and the airbag, a base cloth panel and the chain-shaped seam constituting the airbag are exposed to high-temperature gas for development after blown out from the inflator, so that a sufficient consideration is required for securing a heat tolerance.

On the other hand, in the technology described in the Patent Document 2, since a fixing operation for the airbag mainly depends on a sandwiching force generated by means of the elasticity of the pressing member between the pressing member and the base plate, the fixing strength for fixing the airbag becomes lower than that in the technology in the Patent Document 1, in which the chain-shaped seam is engaged with the member on the vehicle body side.

The present invention has been made in view of the above-described problems and it is an object of the present invention to provide an airbag apparatus, in which the airbag-fixing portion is protected from a gas for development, and in which a fixing strength for fixing the airbag is improved.

Further objects and advantages of the invention will be apparent from the following description of the invention.

SUMMARY OF THE INVENTION

In order to solve the above-described problems, the airbag apparatus of the present invention comprises an airbag including a base end portion to be fixed to a vehicle body side, and an occupant-restraining portion for restraining an occupant, in which an opening through which a gas for development is blown into the airbag is formed at the base end portion; a retainer provided on the vehicle body side and holding the base end portion of the airbag; a bag ring formed to have a ring shape, contacting with an internal surface of the airbag, disposed in an approximately concentric manner with the opening of the airbag, and sandwiching an area of a periphery of the opening of the airbag between the retainer and the bag ring; and a gas-generating device inserted into the airbag from the opening of the airbag and an inner diameter side of the bag ring, and discharging the gas for development.

The airbag includes a stitching portion disposed adjacent to a peripheral edge portion of the opening. The bag ring is provided with an airbag-holding surface portion provided on an outer diameter side relative to the stitching portion when looking from the opening of the airbag, and sandwiching a base cloth panel of the airbag; an engaging portion provided at an end portion of the airbag-holding surface portion adjacent to the stitching portion, and engaging the base cloth panel constituting the airbag with the stitching portion when the base cloth panel is displaced from the bag ring; and a flow-regulating portion for the gas for development provided on an inner diameter side of the airbag-holding surface portion, in which at least an area in the vicinity of an inner peripheral edge portion is formed to serve as an inclined plane where a distance in a normal line direction from the base cloth panel increases from the inner peripheral edge portion to the outer diameter side. The flow-regulating portion isolates the stitching portion from a blowing outlet of the gas-generating device.

Currently, the bag ring is integrally formed by a pressing process for a sheet metal material, for example, a steel plate or the like. However, other material and a manufacturing method may be made.

Further, although the stitching portion can be typically formed into a chain stitch (chain like seam) that is well known by those skilled in the art, the stitching portion is not limited thereto and other stitching work, such as a lockstitch, or the like may be applicable.

According to the present invention, in case that the base cloth panel in the periphery of the opening is pulled to the outer diameter side of the opening and displaced from the bag ring due to the pressure of the gas for development at a time when the airbag is developed, the stitching portion is caught on the engaging portion of the bag ring and engaged therewith, so that the more displacement is prevented. Therefore, a pulling out of the airbag-fixing portion can be prevented and a fixing strength of the airbag is improved.

Further, the gas for development, which is blown out from the gas-generating device, flows along the inclined plane of the flow-regulating portion for the gas for development, and splatters up from the base cloth panel side of the periphery of the opening. And, the gas for development is prevented from blowing into a gap between the bag ring and the base cloth panel. Therefore, there is no possibility that the stitching portion and the base cloth panel therearound are exposed to a high-temperature gas for development, and endurance is easily secured.

Further, in the present invention, the flow-regulating portion for the gas for development can be constructed to have an approximately circular arc shape in which the airbag-inner portion side is formed to have a convex shape in a lateral cross-sectional surface that is seen by cutting the bag ring in a radial direction.

According to the invention, the bag ring can be formed into an easy-to-form shape by, for example, a sheet metal pressing process, so that the productivity can be improved.

On the other hand, instead of the above-described construction, the aforementioned flow-regulating portion for the gas for development may have a construction provided with a tapered surface in which a distance in a normal line direction from the base cloth panel increases in correspondence to a distance from the inner peripheral edge portion.

According to the invention, the flow of the gas for development, which is blown out from the gas-generating device is configured to be smooth, and the developing operation of the airbag can be efficiently performed.

As described above, according to the present invention, by providing the engaging portion for engaging the stitching portion in the peripheral edge portion of the opening of the airbag, and the flow-regulating portion for a gas for developing for splattering the gas for development from the base cloth panel in the periphery of the opening in the bag ring, it is possible to provide an airbag apparatus in which the airbag-fixing portion is protected from the gas for development, and the fixing strength for the airbag is improved.

BRIEF DESCRIPTION OF THE DRAWINGS

FIG. 6 is a cross-sectional view illustrating a peripheral portion of a bag ring in a second embodiment of the airbag apparatus, in which the present invention is applied.

DETAILED DESCRIPTION OF PREFERRED EMBODIMENTS

First Embodiment

Hereinbelow, a first embodiment of an airbag apparatus of the present invention will be explained with reference to FIG. 1 through FIG. 4(c).

The airbag apparatus according to the first embodiment is mounted on a center portion of a steering wheel of an automobile for example, and is used in a driver's seat for restraining an upper body of a driver at a time of a front collision.

Figure 1:
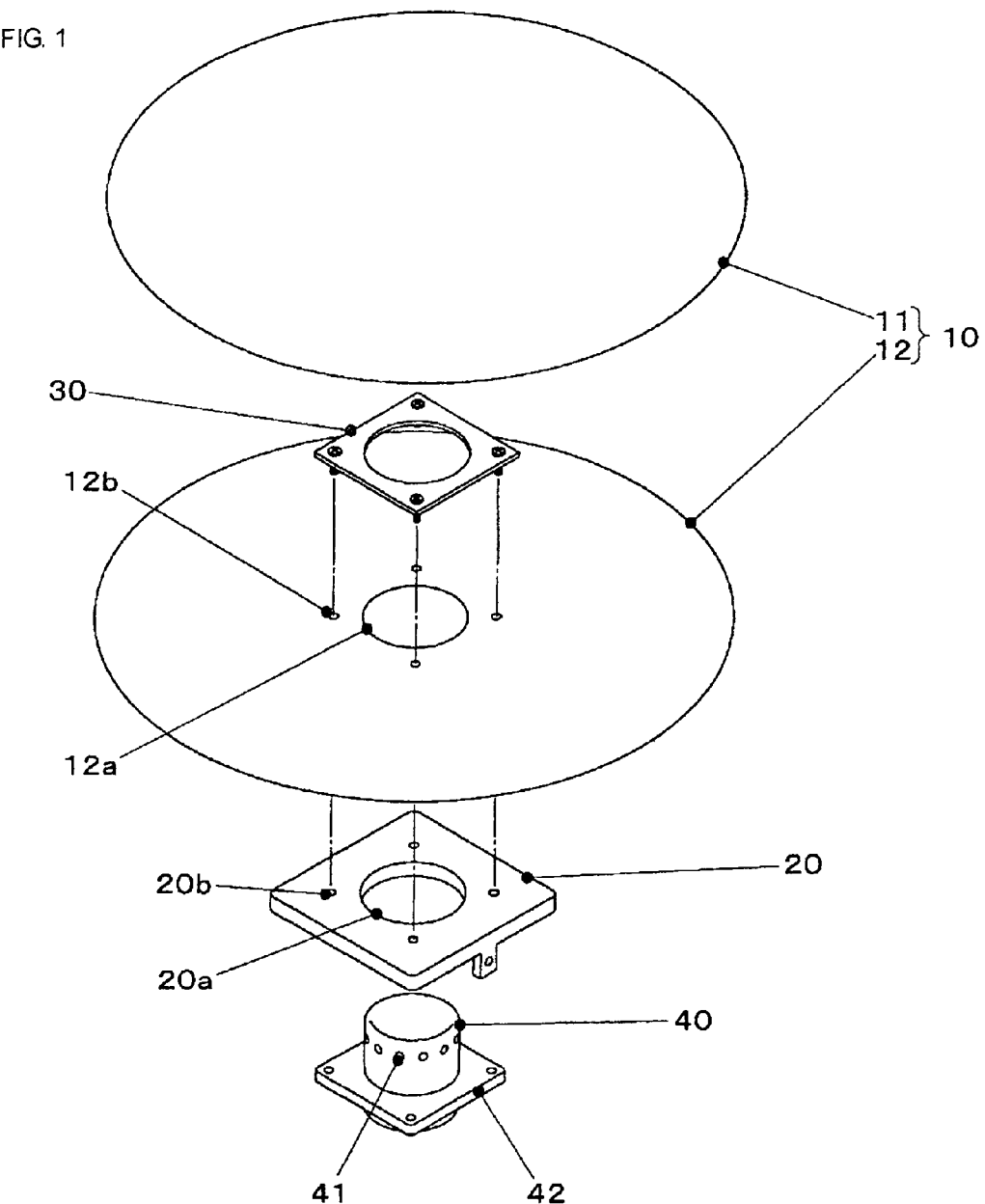
FIG. 1 is a schematic exploded perspective view illustrating a first embodiment of an airbag apparatus, in which the present invention is applied.

FIG. 1 is a schematic exploded perspective view illustrating the airbag apparatus.

An airbag apparatus 1 is provided with an airbag 10, a retainer 20, a bag ring 30, an inflator 40, and so forth.

The airbag 10 is formed into a bag shape by stitching a plurality of base cloth panels made of, for example, polyester, nylon or the like. The airbag 10 is initially housed in a folded back state, and is expanded and developed by means of the pressure of a gas for development, which is blown thereinto from the inflator 40 at a time of the collision of the vehicle, or the like.

The airbag 10 is constructed by stitching, for example, a front panel 11 and a rear panel 12 serving as main panels constituting a main outer surface portion, and an auxiliary panel (not illustrated).

The front panel 11 is a panel disposed to face a passenger side (not illustrative). The rear panel 12 is a panel disposed on a retainer side of the front panel 11, and an outer peripheral edge portion thereof is stitched to an outer peripheral edge portion of the front panel 11.

The front panel 11 and the rear panel 12 are formed to have an approximately round shape. In addition, at a center portion of the rear panel 12, an opening 12a, into which the inflator 40 is inserted, and bolt holes 12b, into which bolts of the bag ring 30 are inserted, are formed.

Figure 2:
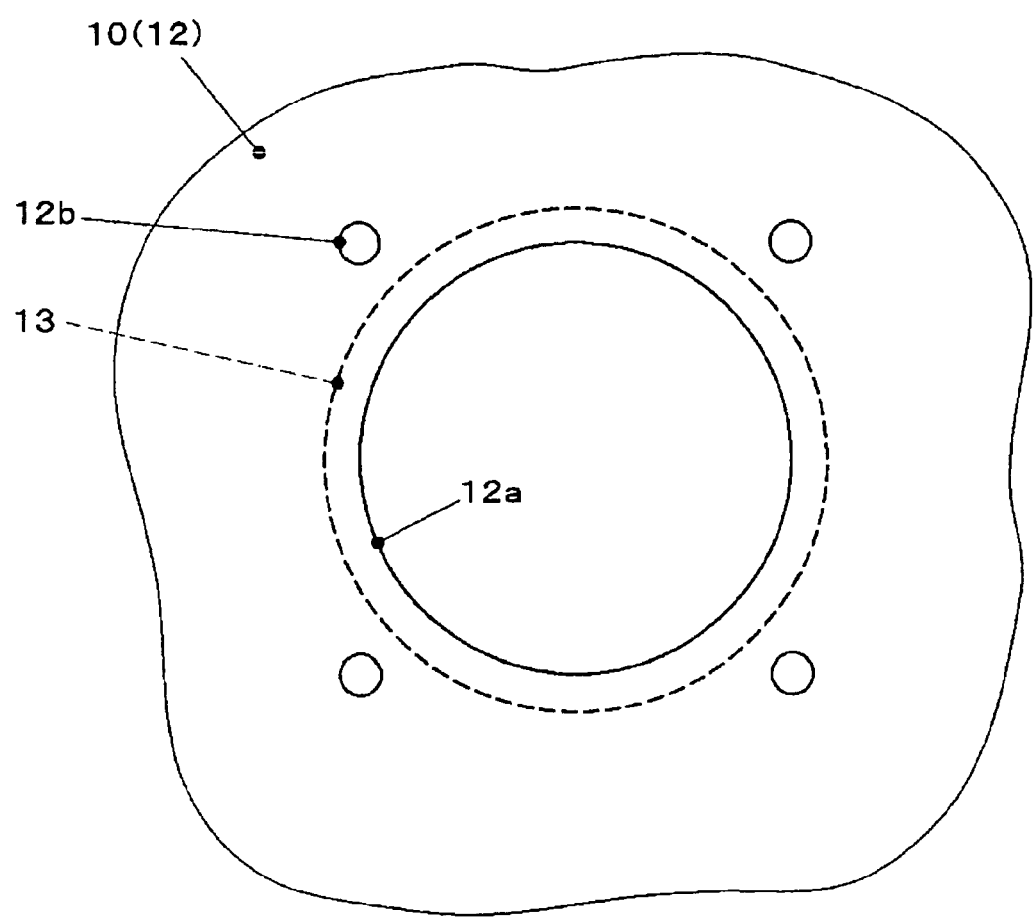
FIG. 2 is a plan view illustrating a center portion of a rear panel of the airbag apparatus in FIG. 1.

FIG. 2 is a plan view illustrating the center portion of the rear panel 12.

The opening 12a is formed to have an approximately round shape and an inner diameter thereof is set to be slightly spaced apart from an outer diameter of the inflator 40.

The bolt insertion holes 12b, for example, four in number are provided around a periphery of the opening 12a. The four bolt insertion holes 12b are disposed in a peripheral of the opening 12a while being spaced apart to each other at approximately even intervals.

Further, a stitching portion 13 is formed around an outer peripheral edge portion of the opening 12a of the rear panel 12. The stitching portion 13 is extended and disposed approximately concentrically in a round shape with the outer peripheral edge portion of the opening 12a.

The retainer 20 is a member that functions as a base portion of the airbag apparatus, which is fixed to a center portion of a steering wheel (not illustrated) of the vehicle. The retainer 20 is provided with a main part having an approximately flat plate shape by a steel plate, for example.

At the center portion of the retainer 20, there are formed an opening 20a, into which the inflator 40 is inserted, and bolt holes 20b, into which the bolts of the bag ring 30 are inserted. The opening 20a and the bolt holes 20b are disposed at positions overlapping the opening 12a of the rear panel 12 of the airbag 10, and the bolt holes 12b.

The bag ring 30 is a circular member that is formed from, for example, a cold strip steel plate, a hot rolling steel plate, or the like, by means of a pressing process, and is a member that sandwiches the peripheral edge portion of the opening 12a of the rear panel 12 of the airbag 10 between the member and the retainer 20. As for the steel plate to make a material of the bag ring 30, a steel plate having high elasticity, such as a spring member, is not used, but a general steel plate having lower elasticity than that of the spring member is used.

Figure 3:
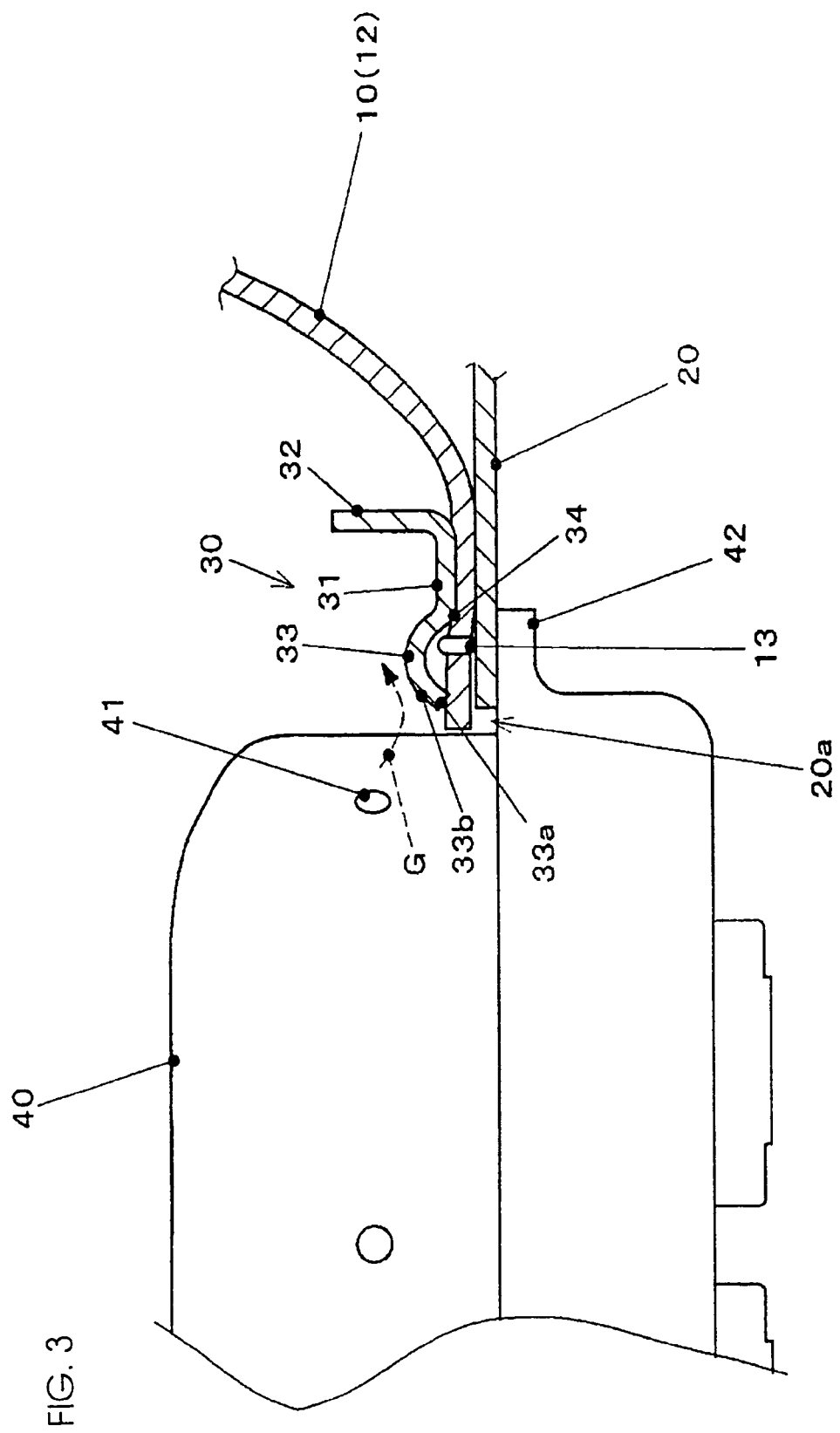
FIG. 3 is a cross-sectional view illustrating a peripheral portion of a bag ring of the airbag apparatus in FIG. 1.

FIG. 3 is a cross-sectional view illustrating a peripheral portion of the bag ring 30 after the airbag 10 is developed, and shows a cross section seen by cutting the bag ring 30 in a radial direction.

Figures 4A, 4B, 4C:
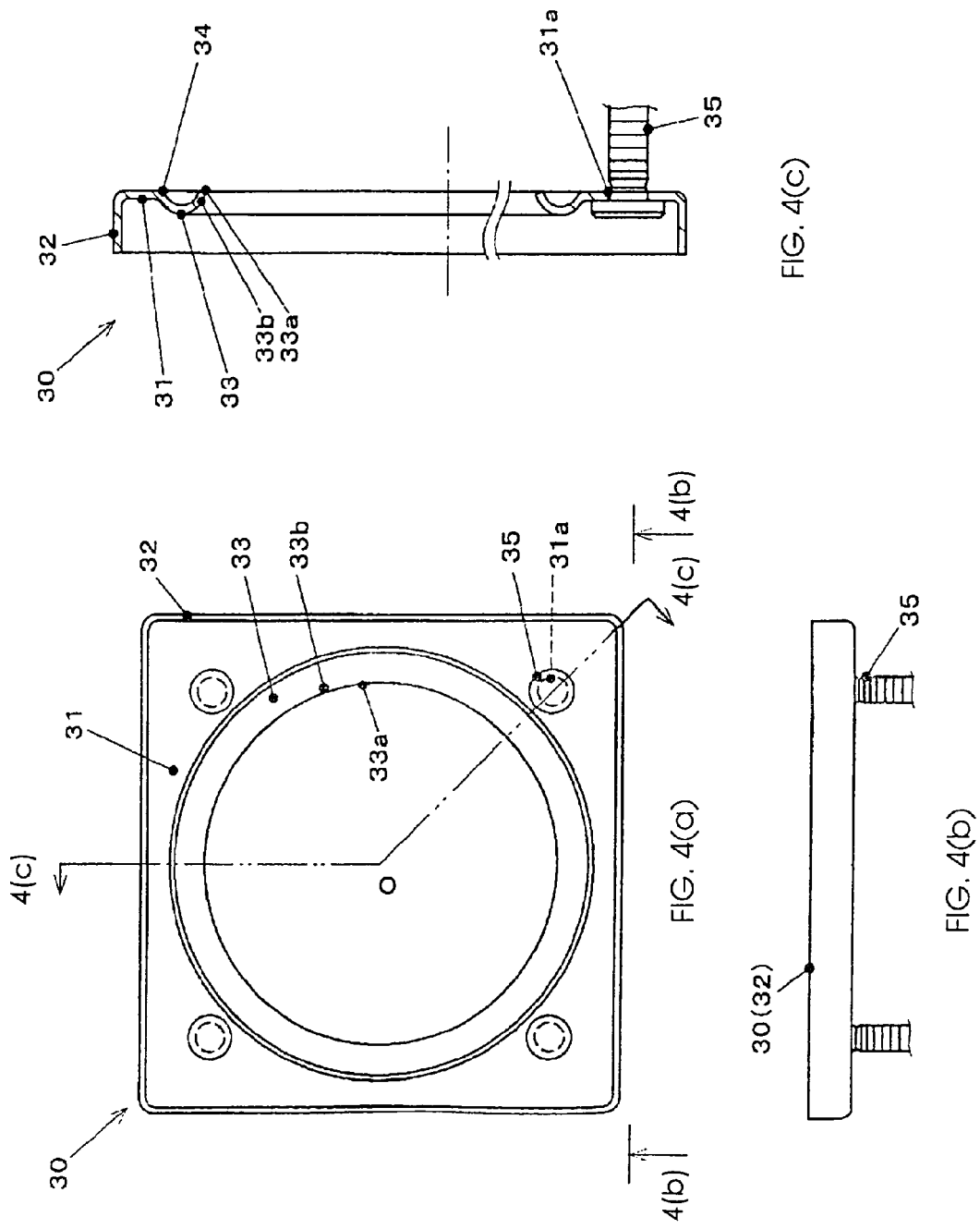
FIGS. 4(a) to 4(c) are views illustrating the bag ring of the airbag apparatus in FIG. 1.

FIGS. 4(a) to 4(c) are views illustrating the bag ring 30, in which FIG. 4(a) is a view illustrating the bag ring 30 looking from a center axis direction thereof, FIG. 4(b) is a fragmentary view taken along line 4(b)-4(b) in FIG. 4(a), and FIG. 4(c) is a fragmentary view taken along line 4(c)-O-4(c) in FIG. 4(a).

The bag ring 30 is provided with a flat plate portion 31, a flange portion 32, a gas flow regulator 33, a stitch-engaging portion 34, bolts 35, and so forth.

The flat plate portion 31 is a portion that is disposed to face a surface portion on the airbag 10 side of the retainer 20, and that sandwiches an area of a periphery of the opening 12a of the rear panel 12 between the retainer 20 and the flat plate portion 31. In the flat plate portion 31, the bolts 35 are inserted and fixed to, for example, four places of the bolt holes 31a spaced apart from each other at approximately even intervals in a peripheral direction of the flat plate portion 31. An inner peripheral edge portion of the flat plate portion 31 is formed to have an approximately round shape, and the inner peripheral edge portion is connected to an outer peripheral edge portion of the gas flow regulator 33. On the other hand, the outer peripheral edge portion of the flat plate portion 31 is formed to have an approximately quadrangle upon overhanging more outward than other portion in the vicinity of the four places of the bolts 35.

The flange portion 32 rises approximately perpendicularly to an inner portion side of the airbag 10 from the outer peripheral edge portion of the flat plate portion 31.

The gas flow regulator 33 overhangs toward an inner diameter side from the inner peripheral edge portion of the flat plate portion 31 to accelerate the gas for development blown out from the gas-blowing outlet 41 of the inflator 40 to flow in a direction away from a panel around a peripheral portion of the opening 12a of the rear panel 12. The gas flow regulator 33 is a regulator that protects the stitching portion 13 not to be exposed to the high-temperature gas for development for a long time as much as possible.

As illustrated in FIG. 3 and FIG. 4(c), the gas flow regulator 33 curves in an approximately circular arc shape in which a side opposite to a retainer 20 side (inner portion side of the airbag 10) is formed to have a convex shape in a lateral cross-sectional surface seen by cutting the bag ring 30 in a radial direction thereof. Moreover, an inner peripheral edge portion (an end portion on an inner diameter side) 33a of the gas flow regulator 33 is positioned on the approximately same flat surface as the surface portion on the retainer 20 side of the flat plate portion 31, as illustrated in FIG. 3. The inner peripheral edge portion 33a may contact with a panel constituting the airbag 10, or may be spaced apart at a slight interval.

By forming the above-described circular arc cross-section shape, an inclined plane portion 33b provided in the vicinity of the inner peripheral edge portion of the gas flow regulator 33 is formed into an inclined plane in such a way that as the position on the inclined plane portion 33b departs from the inner peripheral edge portion, the distance in a normal line direction from the retainer 20 and the rear panel 12 increases.

Further, the gas flow regulator 33 is disposed in a manner so as to block the stitching portion 13 of the airbag 10 from the gas-blowing outlet 41 of the inflator 40, as illustrated in FIG. 3. Incidentally, the blocking operation described here refers to a state that at least a part of the gas flow regulator 33 exists on a straight line connecting the gas-blowing outlet 41 and the stitching portion 13 so that the gas for development blown out from the gas-blowing outlet 41 of the inflator 40 is not directly blown on the stitching portion 13.

The stitch-engaging portion 34 is a surface portion on the retainer 20 side of the bag ring 30, and is a corner portion provided at a joining portion of the inner peripheral edge portion of the flat plate portion 31 and the outer peripheral edge portion of the gas flow regulator 33. In the stitch-engaging portion 34, a rounded edge portion (curved surface portion) that is unavoidably formed during the pressing process is provided.

The above-described stitching portion 13 of the airbag 10 is disposed while being spaced apart from the stitch-engaging portion 34 on the inner diameter side of the stitch-engaging portion 34 before the airbag 10 is developed. Furthermore, at a time of expanding and developing operation of the airbag 10, when the rear panel 12 at the peripheral portion of the opening 12a is pulled to an outer diameter side and displaced from the retainer 20 and the bag ring 30 due to the pressure of the gas for development, the stitching portion 13 is caught on the stitch-engaging portion 34 of the bag ring 30, so that the more displacement of the rear panel 12 to the outer diameter side is blocked.

Incidentally, the above-described flat plate portion 31, the flange portion 32, the gas flow regulator 33, and the stitch-engaging portion 34 are integrally formed by the pressing process of one steel plate, for example.

The bolt 35 is a bolt for fastening the bag ring 30 to the retainer 20 in a state of sandwiching the rear panel 12 of the airbag 10, and is provided to project from the bag ring 30 to a side of the retainer 20. Four bolts 35 provided, for example, to be spaced apart from each other in a peripheral direction of the bag ring 30.

The inflator 40 is a gas-generating device generating the gas for development upon receiving an electric signal from a airbag control unit (not illustrate) at a time of collision of the vehicle, or the like. The inflator 40 is provided with a gas-generating agent that generates a gas in combustion, an igniter for igniting the gas-generating agent upon receiving the electric signal, or the like.

The inflator 40 is a so-called disk type inflator in which the outer shape is formed into a thick disk shape, and a plurality of the gas-blowing outlets 41 is provided on the outer peripheral surface thereof, while being spaced apart in a peripheral direction.

The inflator 40 is inserted into an inside of the airbag 10 through the opening 20a of the retainer 20, an inner diameter side of the bag ring 30, and the opening 12a of the rear panel 12 of the airbag 10 having a posture such that a center axis direction of the inflator 40 is approximately conformed to the normal line direction of the retainer 20.

The above-described gas-blowing outlet 41 is formed on an outer peripheral surface at a portion in which the inflator 40 is inserted into the inside of the airbag 10.

Moreover, the inflator 40 is provided with a flange 42 that is overhanging from the outer peripheral surface in a flange like manner. The flange 42 fixes the inflator 40 to the retainer 20 by being fixed to a surface portion of the retainer 20 with, for example, bolts and nuts, or the like.

Incidentally, it is preferable if the height of the above-described gas flow regulator 33 is lower than the height of the gas-blowing outlet 41 of the inflator 40, because a negative effect applied to a flow of the gas for development can be reduced.

Next, an advantage of the above-described first embodiment will be explained in comparison with a below explaining comparative example of the present invention. Incidentally, in the below explaining comparative example and a second embodiment, the same numerals are attached to the substantially same parts as those in the above-described first embodiment, and the explanation will be omitted, and points of difference will be mainly explained.

An airbag apparatus in the comparative example is provided with a below explaining bag ring 230 in replacement of the bag ring 30 in the above-described first embodiment.

Figure 5:
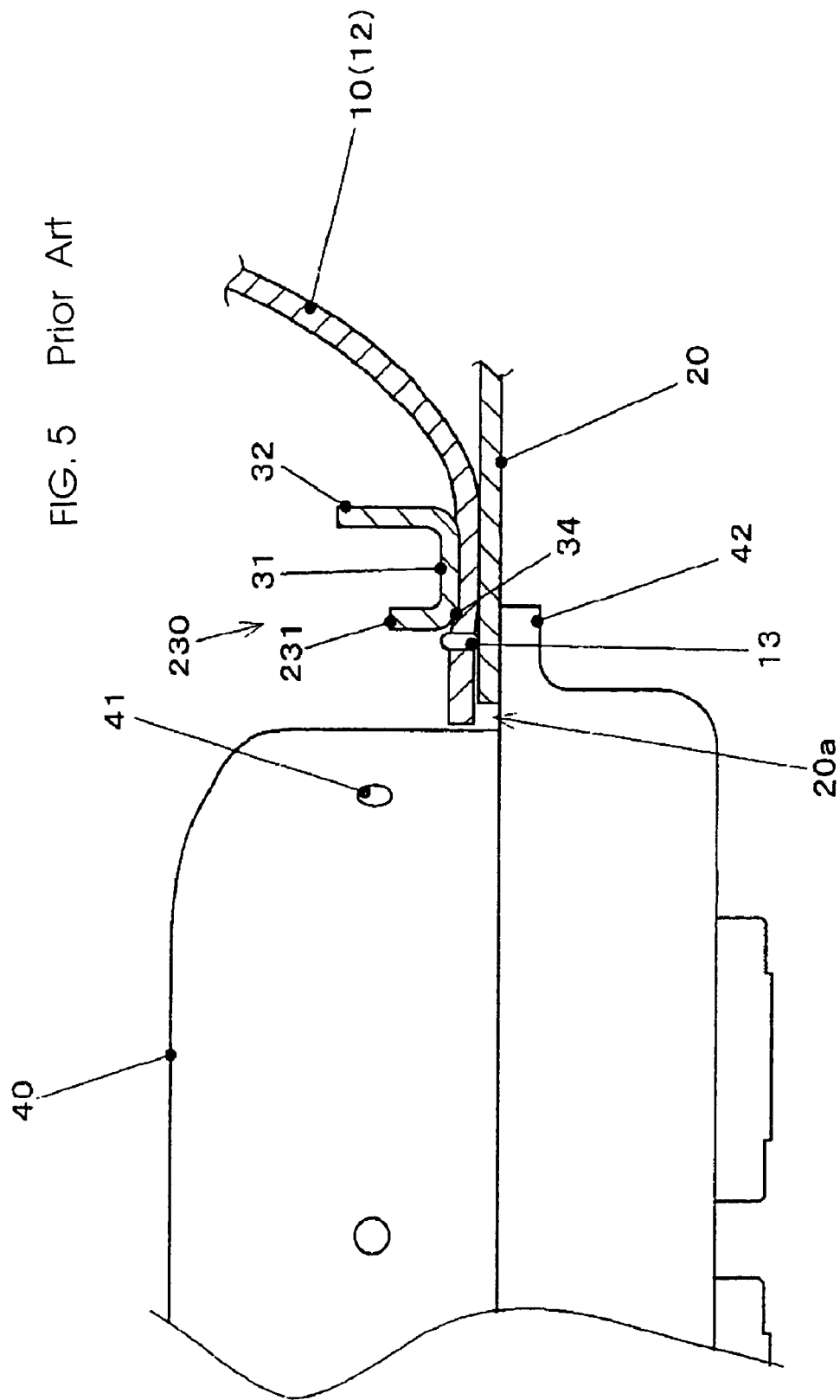
FIG. 5 is a cross-sectional view illustrating a peripheral portion of a bag ring of a conventional airbag apparatus, as a comparative example of the present invention.

FIG. 5 is a cross-sectional view illustrating a peripheral portion of the bag ring 230 after an airbag is developed.

The bag ring 230 is provided with a flange portion 231 that is formed by approximately perpendicularly rising from the inner peripheral edge portion of the flat plate portion 31, instead of a portion corresponding to the gas flow regulator 33 of the bag ring 30 in the first embodiment. The stitch-engaging portion 34 is provided at a boundary portion of the flat plate portion 31 and the flange portion 231.

In the above-described comparative example, since a part of the high-temperature gas for development just after blown out from the gas-blowing outlet 41 of the inflator 40 directly hits the stitching portion 13 and the rear panel 12 therearound, a countermeasure such as increasing the heat tolerance, or the like is necessary so as to prevent damage therefore. Further, a part of the gas for development also enters a gap between the bag ring 230 and the rear panel 12.

In contrast, in the first embodiment, the gas for development blown out from the gas-blowing outlet 41 of the inflator 40 to the retainer 20 side is hard to intrude to the side of the rear panel 12 opposite to the retainer 20 side by means of the inclined plane portion 33b in the vicinity of the inner peripheral edge portion 33a of the gas flow regulator 33 of the bag rind 30 (a gas flow G is illustrated in FIG. 3). Therefore, there is no possibility that the stitching portion 13 and the rear panel 12 in the vicinity thereof are exposed to the high-temperature gas for development and the heat tolerance is easily obtained.

Furthermore, in the first embodiment, in case that the rear panel 12 is pulled and displaced from the retainer 20 and the bag ring 20 due to the pressure of the gas for development, the stitching portion 13 is caught on the stitch-engaging portion 34 of the bag ring 30, so that the more displacement of the rear panel 12 can be prevented and the fixing strength of the airbag 10 can be improved.

Second Embodiment

Next, a second embodiment of an airbag apparatus where the present invention is applied will be explained.

FIG. 6 is a cross-sectional view illustrating a peripheral portion of a bag ring of the second embodiment, and illustrating a cross-section surface corresponding to that of FIG. 3 in the first embodiment.

The airbag apparatus of the second embodiment is provided with a below explaining bag ring 130 instead of the bag ring 30 of the first embodiment.

The bag ring 130 is a bag ring in which below explaining rising-up portion 131 and tapered surface portion 132 are provided instead of the gas flow regulator 33 of the bag ring 30 of the first embodiment.

The rising-up portion 131 is a surface portion rising up from the inner peripheral edge portion of the flat plate portion 31 to the side opposite to the retainer 20 side.

The tapered surface portion 132 is formed to overhang to the inner diameter side from an end portion (upper end portion) on the side opposite to the retainer 20 side of the rising-up portion 131. The tapered surface portion 132 is formed in a manner such that a distance from the retainer 20 continuously increases from an inner diameter side to an outer diameter side of the tapered surface portion 132. As a result, the tapered surface portion 132 is formed in such a way that a cross-sectional surface shape seen by cutting the bag ring 130 in a radial direction becomes an approximately straight line shape inclined relative to the retainer 20.

Further, the tapered surface portion 132 blocks the stitching portion 13 and the rear panel 12 in the vicinity of the stitching portion 13 from the gas-blowing outlet 41 of the inflator 40.

Incidentally, the above-described flat plate portion 31, the flange portion 32, the rising-up portion 131, and the tapered surface portion 132 are integrally formed by the pressing process of one steel plate.

According to the above-explained second embodiment, in addition to the same advantage as that in the above-described first embodiment, a portion in the bag ring 130, which substantially contributes to a flow regulation for the gas for development, increases and a flow of the gas for development becomes smooth by providing a tapered surface portion 132 forming an inclined plane relative to the retainer 20.

Incidentally, a technical scope of the present invention is not limited by the above-described embodiments, and an appropriate modification may be added to the construction of the airbag apparatus.

(1) The airbag apparatus of each embodiment is used in, for example, a driver's seat, which is mounted in a center portion of a steering wheel. However, the present invention is not limited thereto, and may be applicable to an airbag apparatus provided with a disk type inflator, such as a passenger airbag apparatus, which is mounted in, for example, an instrument panel, or the like.

(2) A structure, a shape, a material, and so forth of each component of the airbag apparatus is not limited to the above-described embodiments, and may be appropriately modified. For example, a shape of the airbag, and an assembling method of each panel, a shape, a structure, a material, a processing method or the like of the retainer, the bag ring, the inflator, or the like may be appropriately modified.

The disclosure of Japanese Patent Application No. 2007-321603 filed on Dec. 13, 2007 is incorporated as a reference.

While the invention has been explained with reference to the specific embodiments of the invention, the explanation is illustrative and the invention is limited only by the appended claims.

What is claimed is:

1. An airbag apparatus comprising:
an airbag including a base end portion to be fixed to a vehicle body, an occupant-restraining portion for restraining an occupant, an opening formed in the base end portion, and a stitching portion disposed adjacent to a peripheral edge portion of the opening;
a retainer attached to the base end portion for holding the airbag;
a bag ring having a ring shape to contact an internal surface of the airbag and disposed approximately concentrically with the opening of the airbag to sandwich a periphery of the opening of the airbag between the retainer and the bag ring; and
a gas-generating device inserted into the airbag for discharging a gas for development of the airbag,
wherein the bag ring comprises an airbag-holding portion provided on an outer side relative to the stitching portion at a side opposite to the opening of the airbag to sandwich the periphery of the base end portion of the airbag; an engaging portion provided at an end portion of the airbag-holding portion adjacent to the stitching portion, and engaging the stitching portion when the base cloth panel is displaced from the bag ring; and a gas flow-regulating portion provided on an inner side of the airbag-holding portion, said flow-regulating portion having an inclined portion inclined relative to a gas blowing direction for protecting the stitching portion from the gas ejecting from the gas-generating device, and
wherein said inclined portion is located at the peripheral edge portion to serve as an inclined plane where a distance from the base cloth panel increases from the inner peripheral edge portion to an outer side.

2. The airbag apparatus according to claim 1, wherein the flow-regulating portion has an approximately circular arc shape projecting toward the occupant restraining portion.

3. The airbag apparatus according to claim 1, wherein the flow-regulating portion is provided with a tapered surface projecting gradually toward the occupant restraining portion.

\* \* \* \* \*